United States Patent [19]
Helle et al.

[11] Patent Number: 5,738,564
[45] Date of Patent: Apr. 14, 1998

[54] NUMERICALLY CONTROLLED GRINDING MACHINE FOR GRINDING WORKPIECES, IN PARTICULAR TOOLS

[75] Inventors: Hans-Joachim Helle, Tübingen; Adolf Nill, Hechingen, both of Germany

[73] Assignee: Walter AG, Tubingen, Germany

[21] Appl. No.: 734,734

[22] Filed: Oct. 21, 1996

Related U.S. Application Data

[63] Continuation of Ser. No. 164,129, Dec. 8, 1993, abandoned.

[30] Foreign Application Priority Data

Dec. 18, 1992 [DE] Germany ............... 42 42 906.4

[51] Int. Cl.⁶ .................................................. B24B 21/06
[52] U.S. Cl. ..................... 451/11; 451/10; 451/48; 451/215; 451/221
[58] Field of Search .......................... 451/9, 10, 11, 451/29, 48, 375, 376, 380, 387, 212, 214, 215, 216, 221, 246

[56] References Cited

U.S. PATENT DOCUMENTS

| | | |
|---|---|---|
| 2,118,304 | 5/1938 | Hertlein . |
| 3,395,491 | 8/1968 | Bürger et al. . |
| 3,395,492 | 8/1968 | Bürger et al. . |
| 4,617,764 | 10/1986 | Reibakh . |

FOREIGN PATENT DOCUMENTS

| | | |
|---|---|---|
| 0 065 590 | 12/1982 | European Pat. Off. . |
| 0 072 887 | 3/1983 | European Pat. Off. . |
| 35 32 903 | 3/1987 | Germany . |
| WO 90/14196 | 11/1990 | WIPO . |

OTHER PUBLICATIONS

Handbuch der Fertigungstechnik (Handbook of Production Technology), 1979, G. Spur et al, "Spanen" Band 3/1 u. 3/2 (Metal Cutting, vol. 3/1 and 3/2 vol. 3/1: pp. 158, 183, 404; vol. 3/2: p. 422.

*Primary Examiner*—Eileen P. Morgan
*Attorney, Agent, or Firm*—Frishauf, Holtz, Goodman, Langer & Chick, P.C.

[57] ABSTRACT

A numerically controlled grinding machine for grinding workpieces, such as tools, and other metallic or ceramic elements, comprises a machine bed (1) having fixedly connected to it a rigid, distortion-free portal (9) which has a reinforcing rear wall (13) rigidly connected to the machine bed, two side stands (10) and a horizontal bridge (11) which extends at a distance above the machine bed (1). A double wheel grinding spindle carrier (20) is adjustably mounted on the portal (9) for positioning along at least one axis (–y). The machine bed (1) projects at one side from the portal (9). The machine bed (1) supports a workpiece carrier movable about a plurality of axes.

15 Claims, 4 Drawing Sheets

NUMERICALLY CONTROLLED GRINDING MACHINE FOR GRINDING WORKPIECES, IN PARTICULAR TOOLS

This application is a continuation of application Ser. No. 08/164,129, filed Dec. 8, 1993, now abandoned.

FIELD OF THE INVENTION

The invention relates to a numerically controlled grinding machine for grinding workpieces, in particular tools, such as rotary workpieces, for example milling cutters, drills and circular broaching tools, and flat workpieces such as turning chisels, flat broaching tools, stamps, punches and the like, which may be metallic or non-metallic, for example ceramic.

BACKGROUND

Machines of this type usually have a machine bed, a grinding spindle carrier having at least one driven grinding spindle carrying at its end at least one grinding wheel. The grinding spindle carrier is adjustable via associated bearing and guiding means relative to the machine bed at least along two axes standing at right angles to one another, and may be pivotable about at least one axis. A workpiece carrier is arranged on the machine bed in the range of action of the grinding wheel(s) of the grinding spindle carrier and mounted for adjustment at least along one axis.

Program-controlled adjusting devices are associated with the grinding spindle carrier and/or the workpiece carrier for imparting to it adjusting movements in the form of longitudinal and rotational movements, respectively, with respect to the individual axes.

Program-controlled grinding machines for grinding rotary workpieces including special tools with and without cutters and other grindable production parts, require high flexibility to enable performance of all of the grinding operations to be carried out on the workpiece with as few different clamping arrangements or operations of the workpiece as possible. The known tool grinding machines for grinding the above-mentioned range of workpieces, and one example of which is described in EP-A1 0 072 887, are all of the so-called column-type design. A vertical column carrying at least one grinding spindle carrier is arranged on an essentially box-shaped machine bed adjacent the workpiece carrier which is adjustable with respect to several translatory and rotary axes. The column is, for its part, adjustable with respect to the workpiece carrier along a translatory axis; it is rotatable about a vertical axis, and the respective grinding spindle carrier is, in turn, pivotably mounted on it.

These grinding machines have indeed proven their worth in practice, but owing to the principle on which they are based, a relatively high degree of technical expenditure is involved. Also for certain machining operations and workpieces a certain restriction of the free space available for the machining area is noticeable. This is due, in particular, to the column which in view of required stability must have a considerable diameter. The grinding spindle must then jut out for a considerable distance. This results in relatively long adjustment paths for the grinding wheels during certain grinding operations in order to place these in the correct spatial position for the respective grinding operation. This requirement also results in relatively large grinding spindle lengths which are already undesired from the point of view of space requirement and bearing conditions.

In particular, in the construction of large machines, portal-type grinding machines are preferably used for flat grinding operations on large workpieces. Such machines are known in various forms. In these portal grinding machines, the portal is usually displaceable relative to the machine bed carrying the workpiece clamping device, and operating platforms and the like are provided to enable the necessary accessibility to the workpiece and the tools. Such machines are neither intended nor designed for machining relatively small workpieces and, in particular, tools with complicated cutting geometries. An example of such a portal grinding machine with a device for changing grinding wheels and an operating platform for walking on at the level of the work table is described in German Patent 35 32 903.

THE INVENTION

It is an object of the invention to provide a program-controlled grinding machine for grinding smaller metallic and non-metallic workpieces, in particular tools, which provides a large work area and high versatility or universality combined with low space requirement and high rigidity with good dynamic characteristics and high efficiency. Non-metallic workpieces can be, for example, ceramic workpieces formed of $Al_2O_3$, $Si_3N_4$ or others.

Briefly, the grinding machine in accordance with a feature of the invention has a rigid, distortion-free portal fixedly connected to the machine bed, two side stands and a horizontal bridge which extends at a distance above the machine bed. The grinding spindle carrier is mounted on the bridge for adjustment along a first axis. The machine is so designed as to project at one side from the portal.

The two stands are preferably arranged in the region of opposite sides of the machine bed. In order to increase their rigidity, they can be additionally supported towards the projecting front side of the machine bed. A closed reinforcing rear wall is provided between the two stands and rigidly connected thereto, to further increase the rigidity, and for this reason it can also be rigidly connected to the machine bed. The rear wall simultaneously forms a sealed rear closure for the work area and together with a covering hood which encloses at least the grinding spindle carrier and the workpiece carrier and is connected to the machine bed and/or the portal and extends over the machine bed. This provides an encapsulation for the entire machine: the covering hood can be sealed off from the portal and the machine bed to prevent lubricant from escaping. The rear or back wall can be concave, bowed or bulged, to have in general a shell or dished or bowl shape. This back wall, in combination with the side stands forms a portal which is open towards the front.

To facilitate accessibility to the workpiece and the grinding wheels from all sides, it is advantageous for the machine bed to be constructed with an essentially part-circular contour, preferably on its projecting front side. Such a machine bed provides very simple and also aesthetically pleasing conditions for the covering hood when it is of essentially bell-shaped or partly cylindrical design.

The new universal grinding machine ensures a large amount of free space for the machining area and is distinguished by small masses which need be moved with short bearing projections for the grinding spindle(s). In spite of the very large work area and the high universality, it is a very compact and rigid machine. Owing to the small mass of the movable parts with the shorter adjustment paths and better lever conditions in comparison with grinding machines of the column-type design, this grinding machine can be subjected to higher dynamic loads than was possible with the hitherto conventional grinding machine design with a comparable power requirement. Hence unproductive work and down-time are shorter, and the efficiency of the grinding machine is, overall, considerably increased.

At the same time, the new design enables the grinding wheel receiving means on the grinding spindles and grinding spindle lengths themselves to be limited to mechanically and geometrically set minimum dimensions so that relatively short adjustment paths are required (in principle, twice the reduction of the distance of grinding wheel attachment device and grinding spindle) in order to bring the grinding wheels into the correct spatial position for the respective grinding operation. A substantially symmetrical machine construction is obtained and thus, for example, right-hand and left-hand spiral milling cutters, drills, etc., can be ground in the same way. Hence the complicated machining of, for example, radius milling cutters and stepped tools is very simple and economical without there being any necessity for larger outer dimensions of the grinding machine.

Power and/or lubricant supply lines for the grinding spindle carrier and its spindle drive can be accommodated in the portal so that they are protected from the influence of lubricants and coolants outside of the work area and cause no impediment in the actual work area.

Depending on the preferred purpose for which the grinding machine is to be used, the grinding spindle carrier itself can be designed with one or several spindles. In a preferred embodiment, it carries at least one drive motor which is coupled via a belt drive to at least one grinding spindle. The belt drive is arranged in a closed housing, in the interior of which a positive air pressure is maintainable with respect to the environment. In practice, this is achieved by the inside housing being supplied by pressurized lock-out air which prevents penetration of lubricant or coolant and hence impairment of the grinding spindle drive. To achieve a short structural design and a uniform bearing load, it is expedient for the belt drive to be coupled to the respective grinding spindle which is supported in bearings at two sides in a region between the two bearing points.

It is expedient for the grinding spindle carrier to be supported on the bridge of the portal via a support which carries an adjustable slide which defines a second axis and has a bearing means for the grinding spindle carrier which define a third axis extending at right angles to the first and second axes towards the projecting front side of the machine bed and on which the grinding spindle body is mounted for pivotal movement about the third axis.

Depending on the number of grinding spindles contained in the grinding spindle carrier, at least one grinding spindle can intersect this third axis with its spindle axis or can be arranged so as to extend at a distance from this third axis. As a rule, the grinding spindle axes themselves extend at right angles to the third axis.

The design and bearing of the workpiece carrier depends to a certain extent on the type and geometry of the workpieces that are chiefly to be maintained. It is often advantageous for the workpiece carrier to be mounted on a bearing element for adjustment along a fourth axis at right angles to the first and second axes on the machine bed. The possibilities for adjustment of the workpiece carrier can be further increased by it being mounted on the bearing element by means of a rotary table defining a fifth vertical axis and, if desired, by means of a compound slide, defining a further sixth and an additional seventh axis standing at right angles, or orthogonally, to one another. Finally, for the machining of rotary workpieces it is advantageous for the workpiece carrier to have a workpiece clamping device which is rotatable about an eighth axis, the workpiece axis of rotation.

DRAWINGS

An embodiment of the subject matter of the invention is illustrated in the drawings which show:

DETAILED DESCRIPTION

Figure 1:
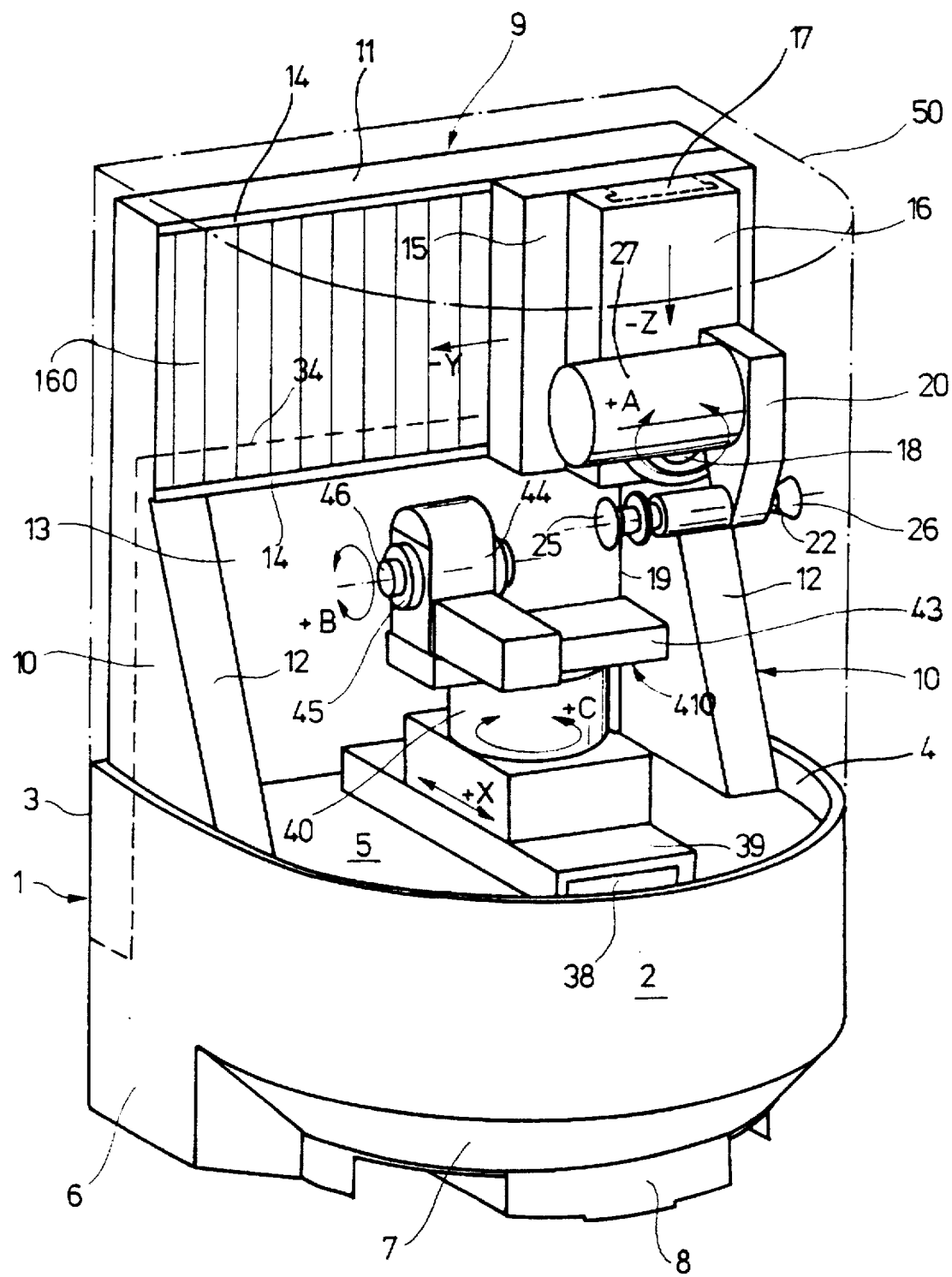
FIG. 1 is a schematic, perspective representation of a grinding machine according to the invention designed for up to 6 numerically controlled (NC) axes.

The grinding machine comprises a box-shaped machine bed 1 which is manufactured either as a casting, for example, from grey cast iron or as a welded construction and in plan view is of essentially part-circular or partly oval design. A correspondingly curved, partly cylindrical circumferential wall 2 extends from a flat rear side 3. At 4 it is drawn upwardly as a rising edge over an essentially flat or slightly funnel-shaped sunken covering bottom wall 5 and then extends towards the rear side 3 and downwards at 6 to the surface on which the machine is mounted. At the front or operating side of the grinding machine opposite the rear side 3, the circumferential wall 2 is set back conically at the bottom at 7 in order to create a free space for the feet of an operator standing at the operating side in front of the grinding machine. An assembly foot arranged in this region is designated 8. Rectangular transportation recesses are provided for fork lift trucks on both sides of the assembly foot.

An essentially U-shaped portal 9 is mounted on the machine bed 1 in alignment with its flat rear side 3. The portal 9 consists of two vertical stands 10 and a bridge 11 joining the stands 10 and extending at a distance above the machine bed 1. The bridge 11 is of beam- or girder-type design with an essentially rectangular cross section. The two stands 10 are arranged in the manner shown in FIG. 1 in the region of opposite sides of the machine bed 1 such that the construction of the machine bed 1 projects on one side from the portal 9. In a side view, they are of approximately triangular shape and are supported by inclined flanges 12 towards the projecting front side of the machine bed, i.e. the operating side. A closed reinforcing and stiffening rear wall 13 is arranged between the two stands 10. Wall 13 seals off rearwardly the space enclosed by the two stands 10, the bridge 11 and the covering wall 5 of the machine bed 1. The rear wall 13 can be flat or curved, e.g. dished or bowl or shell-shaped. The rear wall 13 is rigidly connected to the bridge 11 and the stands 10 as well as to the machine bed 1 and simultaneously forms a reinforcement for the portal 9.

The rigid, distortion-free portal 9 can be manufactured in one or several parts, in the given circumstances, in box-type construction as a welded or cast structure, and rigidly connected, for example by screwing to the machine bed 1. Alternatively, the machine bed 1 and the portal 9 can also be a one-part casting.

Figure 2:
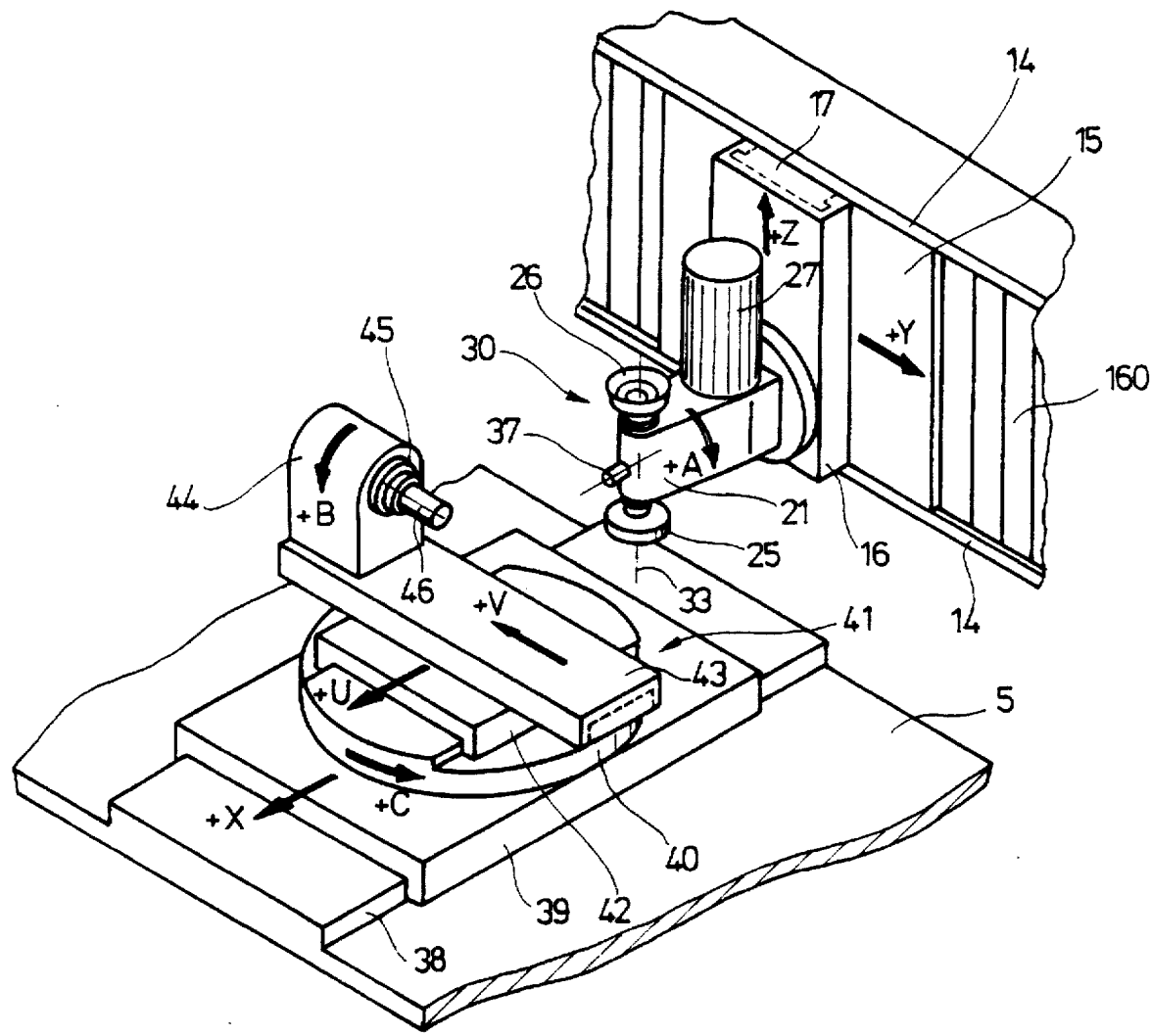
FIG. 2 is a perspective fragmentary representation on a different scale of part of the grinding machine according to FIG. 1, designed for a maximum of 8 numerically controlled (NC) axes to illustrate the alignment and mutual association of the individual translatory and rotary axes of adjustment of the grinding spindle carrier and of the workpiece carrier of the grinding machine.

On its front side facing the projecting machine bed 1, the bridge 11 carries a horizontal longitudinal guide indicated at 14 in FIG. 1 on which a support 15 is mounted for longitudinal displacement along a first horizontal axis, the linear axis −y. The longitudinal guide 14 can be covered in the usual way by a bellows 160 (FIGS. 1 and 2).

A vertical slide 16 is guided on the support 15 via a linear guide indicated at 17 for longitudinal displacement along a second axis, the linear axis −z. The linear axis −z runs at right angles to the horizontal linear axis −y; it is thus vertically oriented.

Figure 4:
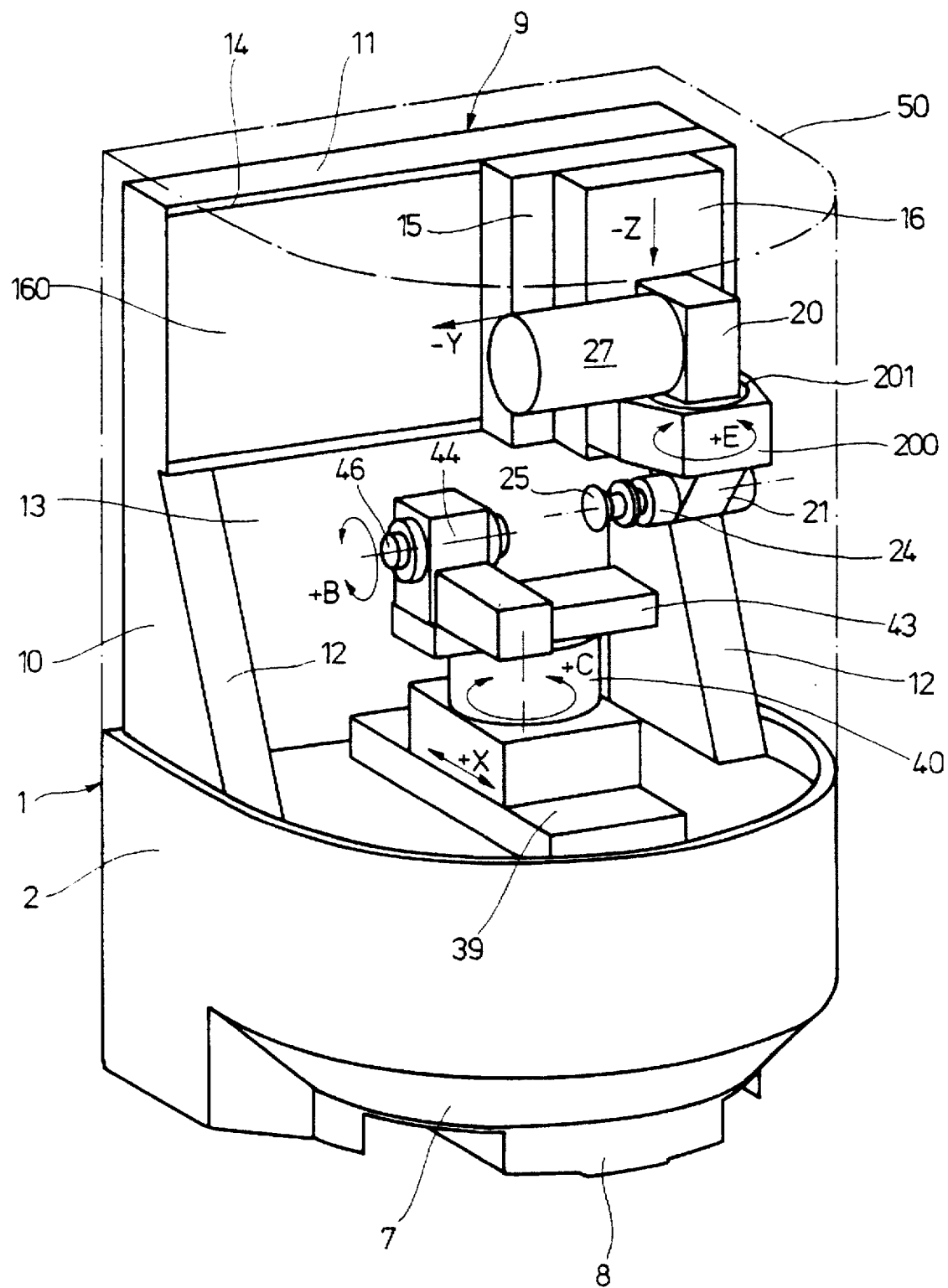
FIG. 4 is an illustration, similar to FIG. 1, of another embodiment of the grinding machine.

A horizontal, cylindrical bearing pin 18 pointing towards the projecting front side of the machine bed 1 is arranged on the front side of the vertical slide 16. A grinding spindle carrier 20 is mounted for pivotal movement at 19 on the bearing pin 18. The bearing pin 18 defines a horizontal third axis extending at a distance above the machine bed 1, the axis of rotation +A, about which the grinding spindle carrier 20 is pivotable over a pivot area of up to 360°. Alternatively or additionally, a vertical pivot plane of the A-axis on the vertical slide, as shown in FIG. 4, is also possible.

Figure 3:
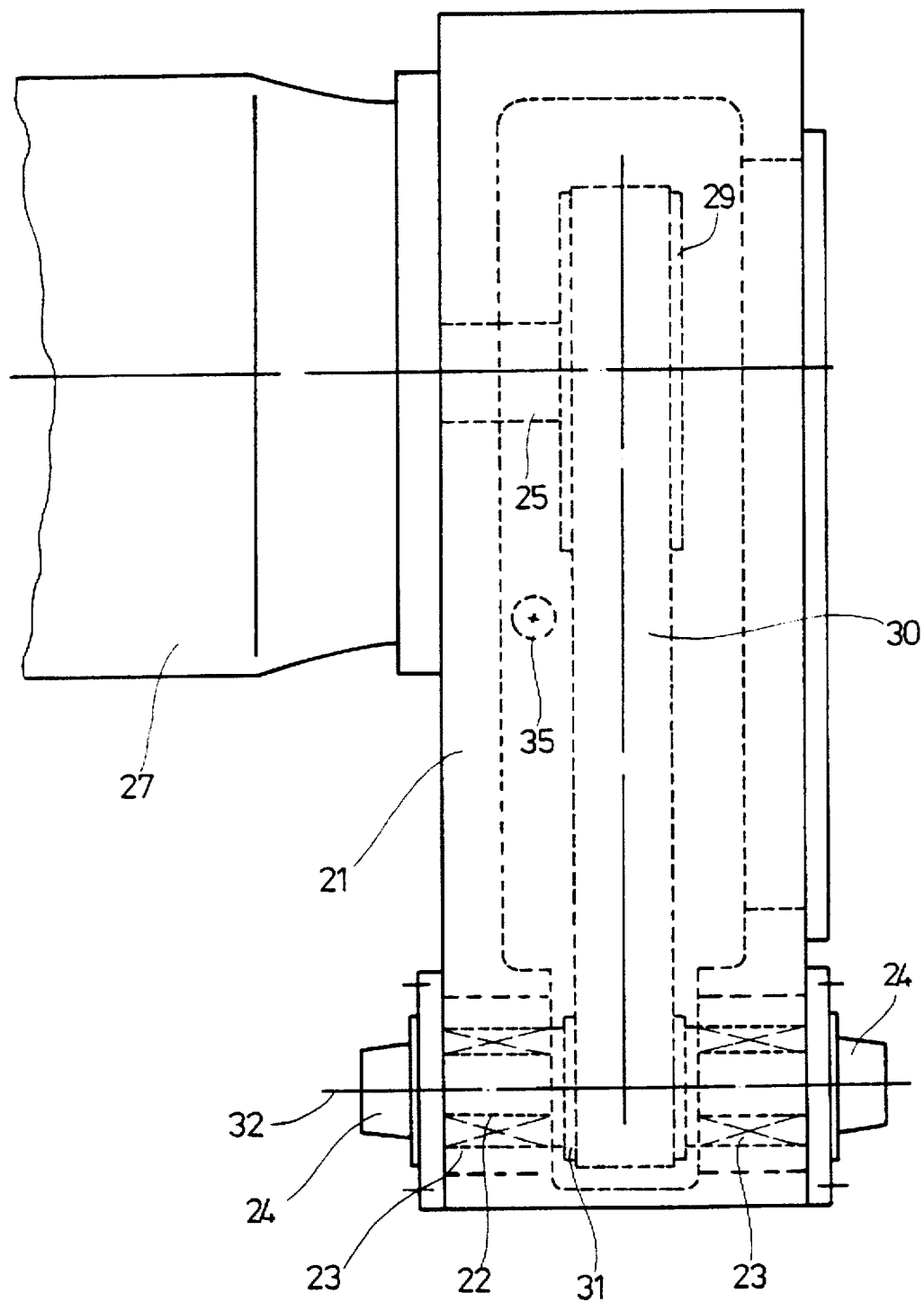
FIG. 3 is a side view in part and on a different scale of the grinding spindle carrier of the grinding machine according to FIG. 1.

The grinding spindle carrier 20 can be constructed for one or several spindles. It comprises an elongate housing 21 (FIG. 3) in which at least one grinding spindle 22 is rotatably mounted at two spaced bearing points 23. The grinding spindle 22 carries on both sides thereof grinding wheel receiving means 24 which project over the housing 21 and on which suitable grinding wheels 25, 26 selected for the particular grinding operation (FIG. 2) are placed.

Instead of the single grinding spindle 22, illustrated in the figures, several, in particular two axially parallel grinding spindles can also be mounted in a corresponding manner in the housing.

All of the grinding spindles 22 are driven by one or two electric motors which is or are flanged to the common housing 21 for all of the grinding spindles. Only one electric motor 27 is provided in the illustrated embodiment. A flat or toothed belt pulley 29 is mounted on its shaft 28 (FIG. 3) and drives the grinding spindle 22 via a flat or toothed belt 30 and a flat or toothed belt pulley 31. To obtain a short construction and achieve a uniform bearing load, the flat or toothed belt pulley 31 lies between the two bearing points 23.

Each grinding spindle 22 is aligned with its spindle axis 32 (FIG. 3) at right angles to the axis of rotation +A, and depending on the number of grinding spindles, the spacing from the axis of rotation +A can be 0 or >0. In the present case, the grinding spindle axis 32 intersects the axis of rotation +A, see FIG. 2.

The support 15, the vertical slide 16 and the grinding spindle carrier 20 are coupled to suitable actuating drives which are known per se and are, therefore, not shown in further detail in the drawings. These actuating drives enable a corresponding adjusting movement along the linear axes −y and −z and a pivotal movement about the axis of rotation +A to be respectively imparted to the support 15, the vertical slide 16 and the grinding spindle carrier 20 in a program-controlled manner. All of the electric connection lines of these actuating drives and of the drive motor 27 or drive motors 27 as well as the coolant and lubricant lines and compressed air lines, if any are provided, extend through the stands 10 and the bridge 11 of the yoke, and the supply lines for the grinding spindle carrier 20 pass through the bearing pin 18 which is in the form of a hollow pin. This is indicated at 34 in FIG. 1.

A normally closed connection 35 for pressurized air is provided on the housing 21 (FIG. 3) to enable the housing interior to be subjected to over-pressure via a corresponding compressed air line. A positive air pressure with respect to ambient pressure prevents cooling emulsions and cooling oils from penetrating the housing and thereby prevents impairment of the functioning of the grinding spindle drive. In this way the entire drive assembly consisting of the drive motor 27, the belt drive 29–31 and the grinding spindles 22 with their bearings 23 is effectively protected.

A measuring probe 37 or any other suitable measuring instrument is attached to the front side of the grinding spindle carrier 20 in the manner apparent from FIG. 2 to determine the position of the machine axes described herein and of the workpiece to be machined in relation to a common reference point. With these data the spatial position of the machine axis in relation to the workpiece to be machined is known to a considerable extent. Together with the geometrical data of the grinding wheels 25, 26 a microprocessor for controlling the actuating drives can then be programmed in such a way that it automatically correctly positions and readjusts the grinding wheels before each grinding operation, referred to as zero point machining.

A longitudinal guide 38 is arranged on the covering wall 5 of the machine bed 1 and extends half-way between the two stands 10 and at right angles to the flat rear side 3 of the machine bed 1. Mounted on the longitudinal guide 38 which extends approximately from the rear side 3 to the projecting front side of the machine bed 1 is a bearing element in the form of a slide 39 for displacement along a fourth axis, the linear axis +x'. The linear axis +x' extends at right angles to the linear axes −y and −z and parallel to the axis of rotation +A.

A round table 40 is mounted on the slide 39 for rotation about a fifth axis, namely the vertical axis of rotation +C. FIG. 1, illustrating the arrangement for a small or simpler machine, shows, an upper table 410 seated on table 40. FIG. 2 illustrates an expanded arrangement, suitable for a larger machine. A compound or cross slide 41 is secured to table 40. The longitudinal slide 42 of cross slide 41 is adjustable along a sixth axis, the linear axis +U', which lies in a horizontal plane. The upper table 410 (FIG. 1) is fixedly connected to either the round table 40, i.e. the C-axis, or—if this is dispensed with—to the slide 39.

The transverse slide 43 of the compound or cross slide 41 is adjustable on the longitudinal slide 42 along a seventh axis, the linear axis +V', which lies in a horizontal plane and extends at right angles to the linear axis +U' which is defined by the longitudinal slide 42. In principle, it is also conceivable for the transverse slide 43 to be designed for rotation relative to the longitudinal slide 42.

Finally, a workpiece carrier 44 comprising a workpiece clamping device 45 in the form of a chuck 45 is seated on the upper table 410 or on the transverse slide 43, respectively. A rotary workpiece, for example a drill or milling cutter illustrated at 46, is clamped in the chuck 45. The chuck 45 is mounted in the workpiece carrier 44 for rotation about a horizontal eighth axis, the axis of rotation +B. This workpiece axis of rotation is designed for high step accuracy when grinding divisions (resolution<=0.001)° and high rotational speed>=300 rpm for circular grinding. Further workpiece carrier elements such as steadyrests, a tailstock and the like, and a truing device can also be arranged on the upper table 410 or on the transverse slide 43, respectively. The round or circular table 40 permits rotation of the workpiece carrier 44 by 360° about the +C axis, without interference from the back wall 14 and/or the stands 12.

The electric actuating drives for the slide 39, the round table 40 and the longitudinal and transverse slides of the compound slide 41 as well as for the chuck 45 are known and not illustrated in further detail in the drawings. They are supplied with power from the interior of the machine bed 1 through a hollow bearing pin of the round table 40 which is likewise not illustrated in further detail. If steadyrests and a tailstock are arranged on the transverse slide 43, these parts can also be designed for automatic adjustment, and the truing roller of the truing device can be designed for program-controlled truing.

Depending on its respective purpose, the grinding machine described herein can be manufactured with 4, 5, 6, 7 or 8 program-controlled axes. In the lowest design stage of the machine with 4 program-controlled axes (−y, −z,+B, x') the grinding spindle carrier 20 can be designed for manual adjustment about the axis of rotation +A for grinding helical leads on the workpiece 46.

In the most versatile form of the machine of the invention (FIG. 3) the translatory main axes, linear axes X', Y, Z, associated with one another in a coordinate system according to German Industrial Standard 66 217, are provided, the minor axes +U', +V', and the rotary main axes A, B, C, and if applicable E, are also provided.

With the arrangement of the main axes described herein, the grinding spindles 22 can be pivoted into any spatial grinding position so that similarly to a Cardan system, in theory, any cutting position and the most complicated of shapes are grindable on the workpiece 46.

FIG. 4 illustrates another embodiment of the grinding machine. Basically, and in all essential respects, it is similar to the embodiment of FIG. 1, and identical parts have been given the same reference numerals and will not be described again. The drawing of FIG. 4 also has been somewhat simplified.

In accordance with the embodiment of FIG. 1, the grinding spindle carrier 20 is journaled on the vertical support 16 for rotation or pivoting about the horizontal +A axis. In the embodiment of FIG. 4, the grinding spindle carrier 20 is rotatable about a vertical axis +E by 180°. The axis +E is spaced from the vertical slide 16. To permits this arrangement, the vertical slide 16 is located in a bearing block 200, which forms a housing and projects forwardly from the front side of the machine. The bearing block 200 carries a pivot bearing 201 for the grinding spindle carrier 20, which also defines the +E axis. The grinding spindle carrier 20 is positioned, together with a support element for the drive motor 27, above the plate-like bearing block 200, as best seen in FIG. 4. The portion 21, which journals the grinding spindle, projects below the bearing block 200.

The bearing block 200 itself can be secured rigidly to the vertical slide 16. Other arrangements are possible, in which the bearing block 200 is pivotably located by one of the parts 18, 19, see FIG. 1, and forming corresponding bearings, for attachment to the vertical slide 16 and pivoting about the horizontal +A axis. This arrangement permits further adjustment possibilities for the grinding disks 25, 26.

The round table 40 in the embodiment of FIG. 4 is similar to the arrangement according to FIG. 1, and it is, likewise, pivotable about the +C axis about 360°. Again, the round table 40 carries the workpiece holder. The spacing of the stand 12 from the back wall 13 is so selected that, at least within normal operating ranges, the rotary movement of the round table 40 and the elements located thereon is not impaired. Thus, the workpiece 46 can be brought into a working or operating position without changing the clamping thereof by simple pivoting into the operating position, in which working on the workpiece at both sides of the longitudinal axis is possible.

Since all electric, pneumatic, lubricant and coolant supply lines are located outside of the immediate wet area, the work area is kept free from all supply lines, eliminating possibilities of dangerous collisions, which considerably reduces the susceptibility to failure.

The grinding machine can also be fully encapsulated in a simple way by an essentially bell-shaped or partly cylindrical covering hood 50 (FIG. 1) consisting of sheet metal with viewing windows or of transparent plastic material being sealingly placed on the machine bed 1 along the contour of the latter and then secured. This covering hood 50 is a completely prefabricated structural component which may also be provided with doors. The structure can also be of such configuration that the covering hood is sealingly secured to the portal 9 at the rear side, but is otherwise sealingly seated on the edge 4 of the machine bed 1.

Various changes and modifications may be made, and any feature described herein may be used with any of the others, within the scope of the inventive concept.

We claim:

1. A numerically controlled grinding machine for precision grinding of workpieces, comprising:

a machine bed;

a workpiece carrier mounted to said machine bed;

a grinding spindle carrier having a driven grinding spindle with a grinding wheel attached thereto;

two side stands spaced from each other and fixedly connected to said machine bed;

a bridge spaced by a given distance above said machine bed and fixedly connected to both of said side stands, said grinding spindle carrier being movably mounted to said bridge above and over said machine bed;

a reinforcing and stiffening rear wall rigidly connected to said machine bed, said bridge and said two side stands to form an integral support unit for said grinding spindle carrier such that a frontally-open workspace is defined by said two side stands, said machine bed, said bridge and said rear wall into which said grinding wheel and said workpiece can extend from the front of said workspace to be controllably moved for carrying out the precision grinding.

2. The grinding machine of claim 1, wherein said rear wall is flat.

3. The grinding machine of claim 1, wherein said rear wall is curved to form a shell-shaped side of said workspace.

4. The grinding machine of claim 1, wherein said rear wall, said two side stands and said bridge are formed as a one-piece casting.

5. The grinding machine of claim 1, wherein said side stands are at opposite sides of said machine bed.

6. The grinding machine of claim 1, wherein said side stands taper upward from a wide base, extending front to back, toward a narrower top.

7. The grinding machine of claim 1, wherein said grinding spindle has one grinding wheel located at each end thereof.

8. The grinding machine of claim 1, wherein said machine bed has a curved contour at its front side.

9. The grinding machine of claim 1, further comprising a covering hood which encloses at least said grinding spindle carrier and said workpiece carrier.

10. The grinding machine of claim 9, wherein said covering hood is sealed to said machine bed, said side stands and said rear wall.

11. The grinding machine of claim 9, wherein said covering hood has a curved front contour.

12. The grinding machine of claim 1, wherein at least one of (i) power supply lines, (ii) lubricant supply lines, and (iii)

coolant supply lines for said grinding spindle carrier and its spindle drive, is located in said integral support unit.

13. The grinding machine of claim 1, wherein said machine bed and said bridge are horizontal, and said workpiece carrier is movably mounted to said machine bed.

14. A numerically controlled grinding machine for precision grinding of workpieces, comprising:

a machine bed;

a workpiece carrier mounted to said machine bed;

a grinding spindle carrier having a driven grinding spindle with a grinding wheel attached thereto;

two side stands spaced from each other and fixedly connected to said machine bed;

a bridge spaced by a given distance above said machine bed and fixedly connected to both of said side stands, said grinding spindle carrier being movably mounted to said bridge above and over said machine bed;

a reinforcing and stiffening rear wall rigidly connected to said machine bed and said two side stands to form an integral support unit for said grinding spindle carrier such that a frontally-open workspace is defined by said two side stands, said machine bed, said bridge and said rear wall into which said grinding wheel and said workpiece can extend from the front of said workspace to be controllably moved for carrying out the precision grinding.

15. A numerically controlled grinding machine for precision grinding of workpieces, comprising:

a machine bed;

a workpiece carrier mounted to said machine bed;

a grinding spindle carrier having a driven grinding spindle with a grinding wheel attached thereto;

two side stands spaced from each other and fixedly connected to said machine bed;

a bridge spaced by a given distance above said machine bed and fixedly connected to both of said side stands, said grinding spindle carrier being movably mounted to said bridge above and over said machine bed;

a reinforcing and stiffening rear wall rigidly connected to said bridge and said two side stands to form an integral support unit for said grinding spindle carrier such that a frontally-open workspace is defined by said two side stands, said machine bed, said bridge and said rear wall into which said grinding wheel and said workpiece can extend from the front of said workspace to be controllably moved for carrying out the precision grinding.

\* \* \* \* \*

UNITED STATES PATENT AND TRADEMARK OFFICE
CERTIFICATE OF CORRECTION

PATENT NO. : 5,738,564
DATED : April 14, 1998
INVENTOR(S) : HELLE et al.

It is certified that error appears in the above-identified patent and that said Letters Patent is hereby corrected as shown below:

On the Title page, Item [56] References Cited,

```
    under "U.S. PATENT DOCUMENTS"  insert:
    --3,656,264    4/1972    Mackey, Jr. et al
      4,709,509   12/1987    Yoneda et al
      5,377,452    1/1995    Yamaguchi--.
```

Signed and Sealed this

Tenth Day of August, 1999

Attest:

Q. TODD DICKINSON

Attesting Officer     Acting Commissioner of Patents and Trademarks